United States Patent [19]

Cross

[11] 4,208,151
[45] Jun. 17, 1980

[54] YARD ROLLER

[76] Inventor: Andrew C. Cross, P.O. Box #173, Westfield, Ill. 62474

[21] Appl. No.: 961,149

[22] Filed: Nov. 16, 1978

[51] Int. Cl.² .............................................. E01C 19/26
[52] U.S. Cl. .................................... 404/122; 404/131; 180/20; 172/518
[58] Field of Search ...................... 404/122, 123, 131; 172/518; 180/20

[56] References Cited

U.S. PATENT DOCUMENTS

| | | | |
|---|---|---|---|
| 1,246,696 | 11/1917 | Ammann | 404/122 |
| 1,811,394 | 6/1931 | Hornsby | 404/122 |
| 2,096,911 | 10/1937 | Moore | 404/122 X |
| 2,133,173 | 10/1938 | Meyer | 404/123 |
| 3,120,159 | 2/1964 | White | 404/131 X |
| 3,422,735 | 1/1969 | Vitry | 404/123 X |
| 3,547,014 | 12/1970 | Austin | 404/131 X |

*Primary Examiner*—Nile C. Byers, Jr.
*Attorney, Agent, or Firm*—Clarence A. O'Brien; Harvey B. Jacobson

[57] ABSTRACT

A yard roller having a frame traversable over ground to be rolled by a drum rotatably mounted on the frame and arranged engaging ground over which the frame traverses. A power unit is mounted on the frame and connected to the drum for rotating the drum and moving the frame together with the drum.

1 Claim, 4 Drawing Figures

YARD ROLLER

BACKGROUND OF THE INVENTION

1. Field of the Invention

This invention relates generally to gardening implements, and particularly to a roller suitable for use on a residential lawns, yards, and the like.

2. Description of the Prior Art

U.S. Pat. No. 917,590, issued Apr. 6, 1909, to J. A. Grafft, and U.S. Pat. No. 1,174,899, issued Mar. 7, 1916, to D. R. Rupert, disclose traction-engine devices which are propelled by a drive frame connection extending from an engine to a sprocket mounted on a drum-like front wheel of the device. Other examples of roller propulsion arrangements can be found in U.S. Pat. Nos. 1,204,767, issued Nov. 14, 1916, to G. R. Holmes; 2,096,911, issued Oct. 26, 1937, to B. Moore, Jr.; 2,436,757, issued Feb. 24, 1948, to W. H. Lewis; 2,534,507, issued Dec. 19, 1950, to B. Essick; and 2,587,343, issued Feb. 26, 1952, to H. W. Lind.

SUMMARY OF THE INVENTION

It is an object of the present invention to provide a self-propelled yard roller of simple and inexpensive, yet rugged and reliable construction.

It is another object of the invention to provide a yard roller constructed from conventional components, yet resulting in a unit which performs in a manner not found in yard rollers and similar implements of conventional construction.

These and other objects are achieved according to the present invention by providing a yard roller having: a frame traversable over ground to be rolled; a drum rotatably mounted on the frame and arranged engaging ground over which the frame traverses; and a power unit mounted on the frame and connected to the drum for rotating the drum and moving the frame together with the drum.

The frame preferably includes a U-shaped element disposed in a single plane and having a web and a pair of spaced, substantially parallel, coextensive legs extending from the web toward and terminating in end portions forming an open end of the element. The drum is rotatably mounted on and arranged extending between the legs at the ends of the legs for bridging the open end of the U-shaped element. A caster wheel is swivel mounted on the web portion of the U-shaped element centrally of the legs so as to form a traversing support for the U-shaped element.

The frame advantageously further includes a platform extending from the web of the U-shaped element, with a cross bar being disposed extending between and connected to the legs of the element along the longitudinal extents thereof. The bar supports the platform in cooperation with the web of the element, and is preferably journaled on the legs so as to act as an output shaft or axle for the power unit of the device.

More specifically, the power unit preferably includes an engine mounted on the platform of the frame, and a gear box connected to the engine, with the aforementioned supporting bar forming the output shaft or axle of the gear box. The output shaft is connected to the drum for rotating same by a suitable drive train, particularly a chain and sprocket drive train.

A handle is pivotal mounted on the frame adjacent the web of the U-shaped element, more specifically pivotally mounted on the platform supported by the web of the U-shaped element and arranged extending away from the drum and frame for permitting a person to control the device from a standing or walking position.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
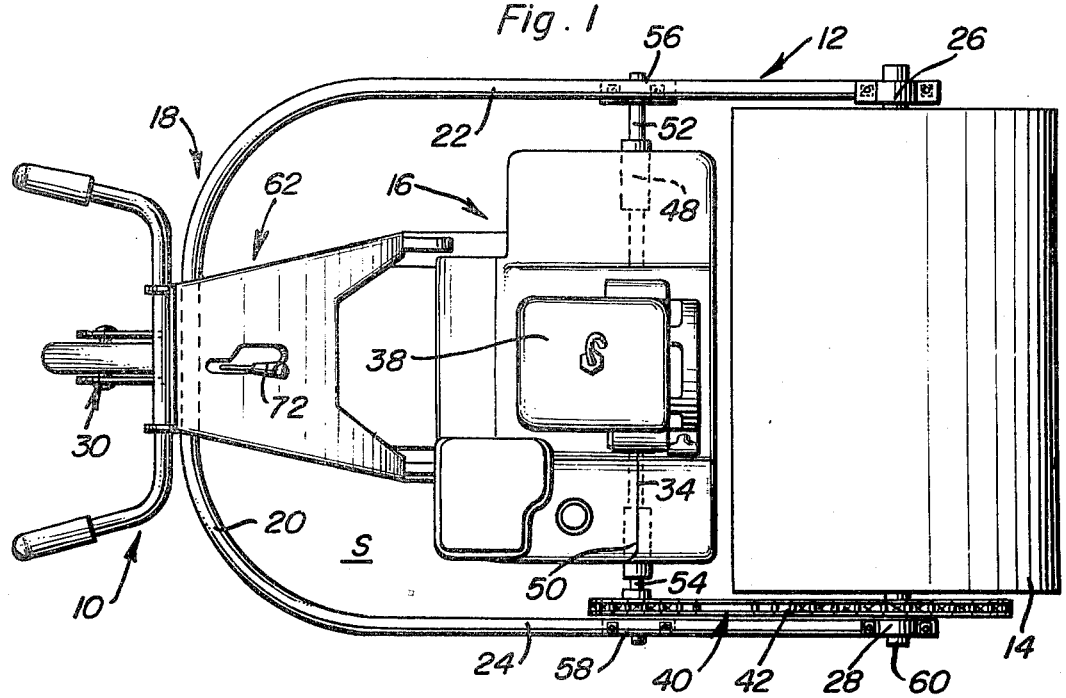
FIG. 1 is a top plan view showing a yard roller according to the present invention.
Figure 2:
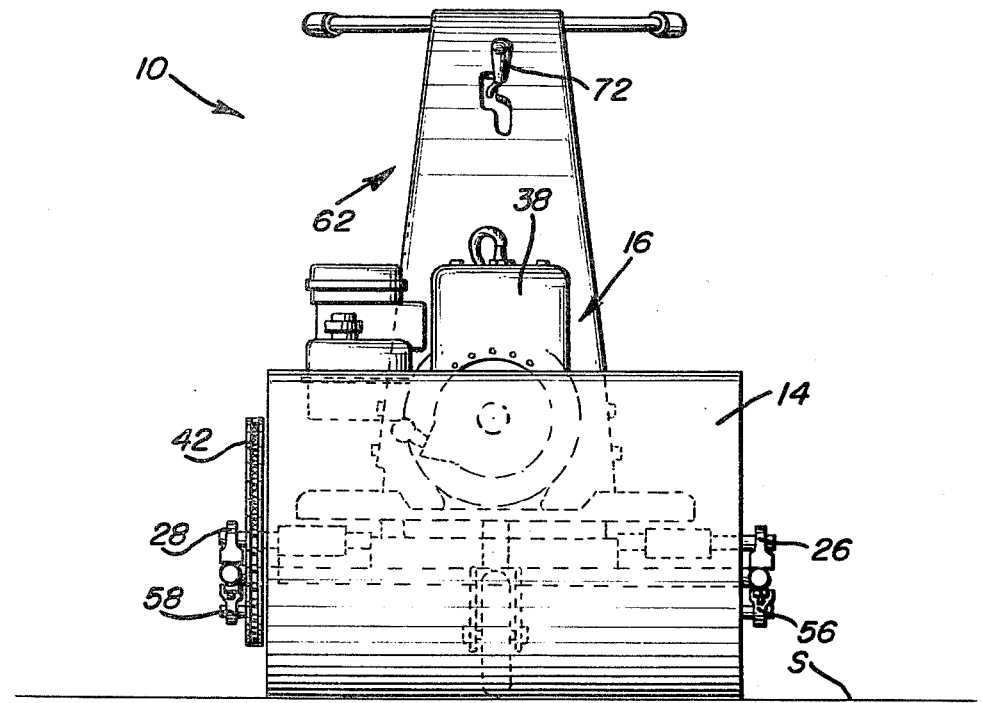
FIG. 2 is a front elevational view showing the yard roller seen in FIG. 1.
Figure 3:
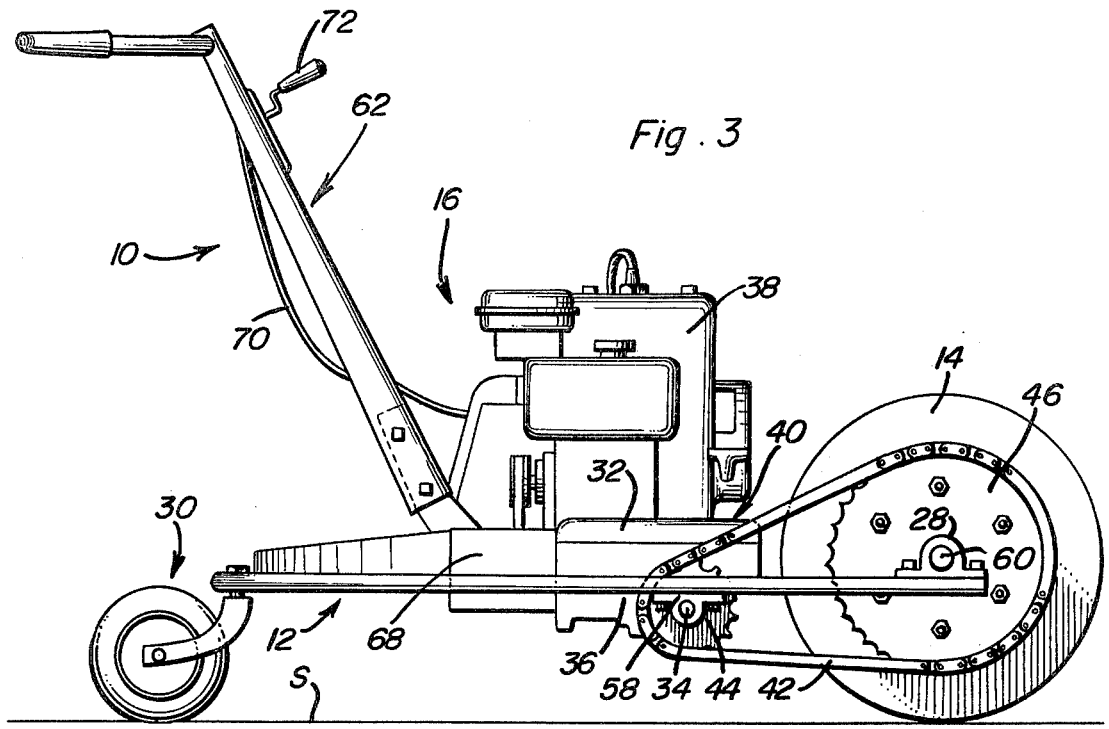
FIG. 3 is a side elevational view showing the yard roller of FIGS. 1 and 2.
Figure 4:
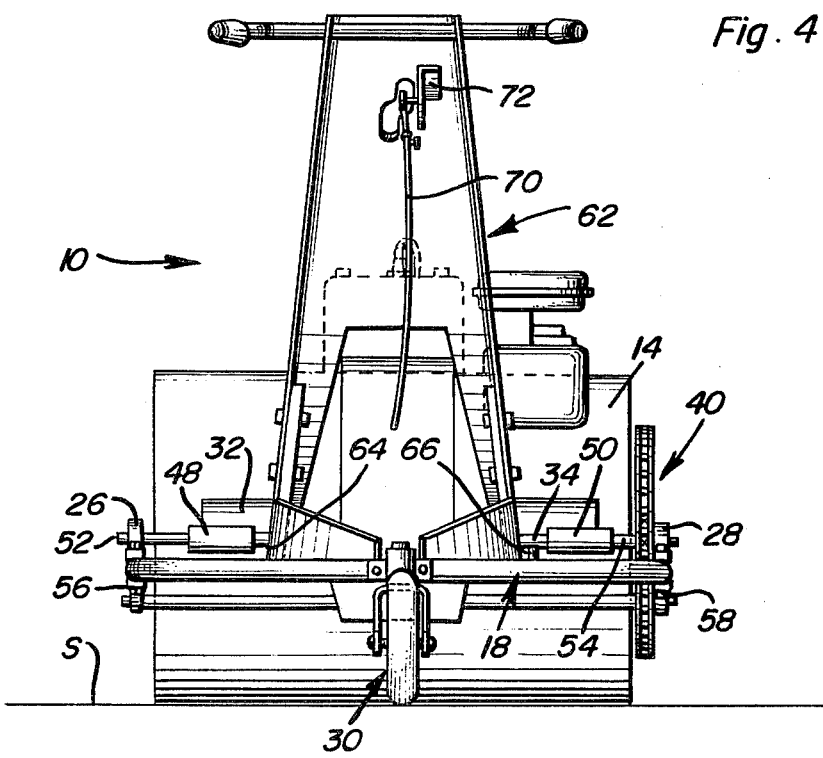
FIG. 4 is a rear elevational view of the yard roller seen in FIGS. 1 through 3.

Referring now more particularly to the figures of the drawings, a yard roller 10 according to the present invention comprises a frame 12 traversable over the surface S of ground to be rolled. A drum 14 is rotatably mounted on frame 12 and arranged engaging surface S over which the frame 12 traverses, while a power unit 16 mounted on frame 12 is connected to drum 14 for rotating drum 14 and moving the frame 12 by rotation of the drum 14.

Frame 12 includes a U-shaped element 18 which lies in a single plane and has a web 20 and a pair of spaced, substantially parallel, coextensive legs 22 and 24 extending from web 20 toward and terminating in ends forming an open end area of element 18. Drum 14 is rotatably journaled on and arranged extending between the legs 22 and 24, as by use of the conventional pillow blocks 26 and 28, for bridging the open end area of element 18. Frame 12 further includes a caster wheel 30 of conventional construction and swivel mounted on web 20 of element 18 substantially centrally of legs 22 and 24 for cooperating with drum 14 to provide a traversing support for element 18.

Frame 12 further includes a platform 32 extending from web 20 of element 18, and a cross bar in the form of axle 34 disposed extending between and connected to legs 22 and 24 of element 18 substantially midway in the longitudinal extent of such legs 22 and 24 for supporting platform 32 in cooperation with web 20 of element 18. Power unit 16 includes a gear box 36 of which axle 34 is the output shaft, which gear box 36 has a right-angle box connected to a conventional internal combustion engine 38, and the like, also mounted on platform 32. Axle 34 is operatively connected to drum 14 by a drive train 40 which includes a sprocket chain 42 and a pair of sprockets 44 and 46 mounted on axle 34 and drum 14, respectively. In actuality, as illustrated, axle 34 has mounted thereof a pair of collars 48 and 50 which connect stub shafts 52 and 54 to axle 34, and it is shafts 52 and 54 which are journaled on the extent of legs 22 and 24 of element 18.

Axle 34, or more specifically the stub shaft 52 and 54 portions thereof, are journaled on legs 22 and 24 of element 18 as by pillow blocks 56 and 58 similar to pillow blocks 26 and 28 which journal axle 60 of drum 14.

A handle 62 is pivotally mounted on frame 12 adjacent web 20 of element 18 as by the illustrated pins 64 and 66 engaged in apertures suitably provided in the upstanding wall portions of a bracket 68 provided on platform 32. Handle 62 extends away from drum 14, and also away from frame 12, in the manner of a handle provided on a lawn mower, rotary tiller, and the like. A cable 70 connects the control throttle of engine 28 to a suitable hand control 72 provided in the hand grip area of handle 62 to permit an operator (not shown) of roller 10 to control engine 38 while guiding frame 12 through handle 62.

As can be readily understood from the above description and from the drawings, a yard roller according to the present invention permits a yard, lawn, and the like, to be smoothed in a simple and inexpensive manner, even by an inexperienced operator.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A yard roller, comprising, in combination:
   (a) a frame transversable over ground to be rolled, said frame including a U-shaped element having a web and a pair of spaced, substantially parallel, coextensive legs extending from the web toward and terminating at ends forming an open end area of the element, a platform extending from the web of the element, and a cross-bar disposed extending between and connected to the legs of the element, the bar supporting the platform in cooperation with the web of the element, a caster wheel swivel mounted at the web of the U-shaped element centrally of the legs of the element for cooperating with the drum to form a traversing support for the U-shaped element;
   (b) a drum rotatably mounted on the frame and arranged extending between the legs at the ends of the legs for bridging the open end area of the U-shaped element and engaging ground over which the frame traverses;
   (c) power means including an engine mounted on the platform, a gear box also mounted on the platform and connected to the engine, and a drive train connected to the gear box and the drum for causing the engine to rotate the drum and propel the frame, the cross-bar being journaled on the legs of the U-shaped element and forming the output shaft of the gear box, the cross-bar being connected to the drive train for actuating same; and
   (d) a handle pivotally mounted on the platform adjacent the web of the U-shaped element and arranged extending away from the drum and frame.

* * * * *